United States Patent
Sergyeyenko et al.

(10) Patent No.: US 7,997,593 B2
(45) Date of Patent: Aug. 16, 2011

(54) BLOWER CART

(75) Inventors: Oleksiy P. Sergyeyenko, Brockville (CA); Kevin W. Covell, Parkton, MD (US)

(73) Assignee: Black & Decker, Inc., Towson, MD (US)

( * ) Notice: Subject to any disclaimer, the term of this patent is extended or adjusted under 35 U.S.C. 154(b) by 296 days.

(21) Appl. No.: 12/191,376

(22) Filed: Aug. 14, 2008

(65) Prior Publication Data
US 2010/0038872 A1  Feb. 18, 2010

(51) Int. Cl.
B62B 1/00 (2006.01)
B62B 7/02 (2006.01)
B62B 3/02 (2006.01)
E01H 1/08 (2006.01)
A47L 5/00 (2006.01)

(52) U.S. Cl. ............. 280/47.26; 280/47.17; 280/47.24; 280/47.33; 280/47.131; 280/654; 280/79.11; 15/340.2; 15/405

(58) Field of Classification Search ............ 280/47.26, 280/47.17, 47.24, 47.33, 47.315, 47.131, 280/654, 79.11, 79.5, 47.18; 15/327.4, 329, 15/340.2, 344, 405
See application file for complete search history.

(56) References Cited

U.S. PATENT DOCUMENTS

| | | | | |
|---|---|---|---|---|
| D130,351 S * | 11/1941 | Hunt | ............... | D34/24 |
| 3,029,086 A * | 4/1962 | Stokvis | ............... | 280/28.5 |
| 3,618,157 A | 11/1971 | Bassin | | |
| 4,037,763 A * | 7/1977 | Turchen | ............... | 224/153 |
| 4,118,826 A | 10/1978 | Kaeser | | |
| 4,789,180 A * | 12/1988 | Bell | ............... | 280/652 |
| 4,875,879 A * | 10/1989 | Bunyea et al. | ............... | 439/501 |
| D328,378 S * | 7/1992 | Hargrove | ............... | D34/24 |
| 5,265,895 A * | 11/1993 | Barrett | ............... | 280/47.24 |
| 5,294,063 A | 3/1994 | Bote | | |
| 5,404,614 A * | 4/1995 | Stephens | ............... | 15/327.2 |
| 5,722,110 A | 3/1998 | McIntyre et al. | | |
| D410,785 S | 6/1999 | Leasure et al. | | |
| 6,009,595 A | 1/2000 | Leasure et al. | | |
| 6,185,917 B1 | 2/2001 | Goudes | | |
| 6,226,833 B1 | 5/2001 | Kawaguchi et al. | | |
| 6,345,489 B1 * | 2/2002 | Everts et al. | ............... | 56/12.7 |
| D461,605 S * | 8/2002 | Griffin | ............... | D32/15 |
| 6,442,790 B1 * | 9/2002 | Svoboda et al. | ............... | 15/330 |
| 6,454,281 B1 * | 9/2002 | Pearson | ............... | 280/47.26 |
| 6,484,351 B2 * | 11/2002 | Griffin et al. | ............... | 15/329 |
| 6,488,293 B1 * | 12/2002 | Mitchell et al. | ............... | 280/47.34 |
| D615,716 S * | 5/2010 | Tinius | ............... | D32/15 |
| 2005/0077695 A1 * | 4/2005 | Sherer et al. | ............... | 280/79.5 |
| 2005/0132531 A1 | 6/2005 | Haberlein | | |
| 2008/0150245 A1 * | 6/2008 | Clatt | ............... | 280/47.24 |

* cited by examiner

Primary Examiner — Terrell McKinnon
Assistant Examiner — Chiedu A Chibogu
(74) Attorney, Agent, or Firm — Kramer & Amado P.C.

(57) ABSTRACT

In various exemplary embodiments, a cart for holding and transporting a portable blower includes one or more of the following: a rotary member configured to receive a housing of a portable blower; a cylindrical base member for supporting the rotary member; a tubular member attached at a lower end thereof to the rotary member and the base member in such a way as to permit the rotary member to be rotatable while supported on the base member; a handle attached to an upper end of the tubular member; and at least one wheel attached to the cart for guiding the cart over a surface. The cart may also include a tube locking member for adjusting the height of the tubular member, a cord retention system for securing the cord of the blower in place, a stand for holding the cart upright, and a tool storage member.

17 Claims, 9 Drawing Sheets

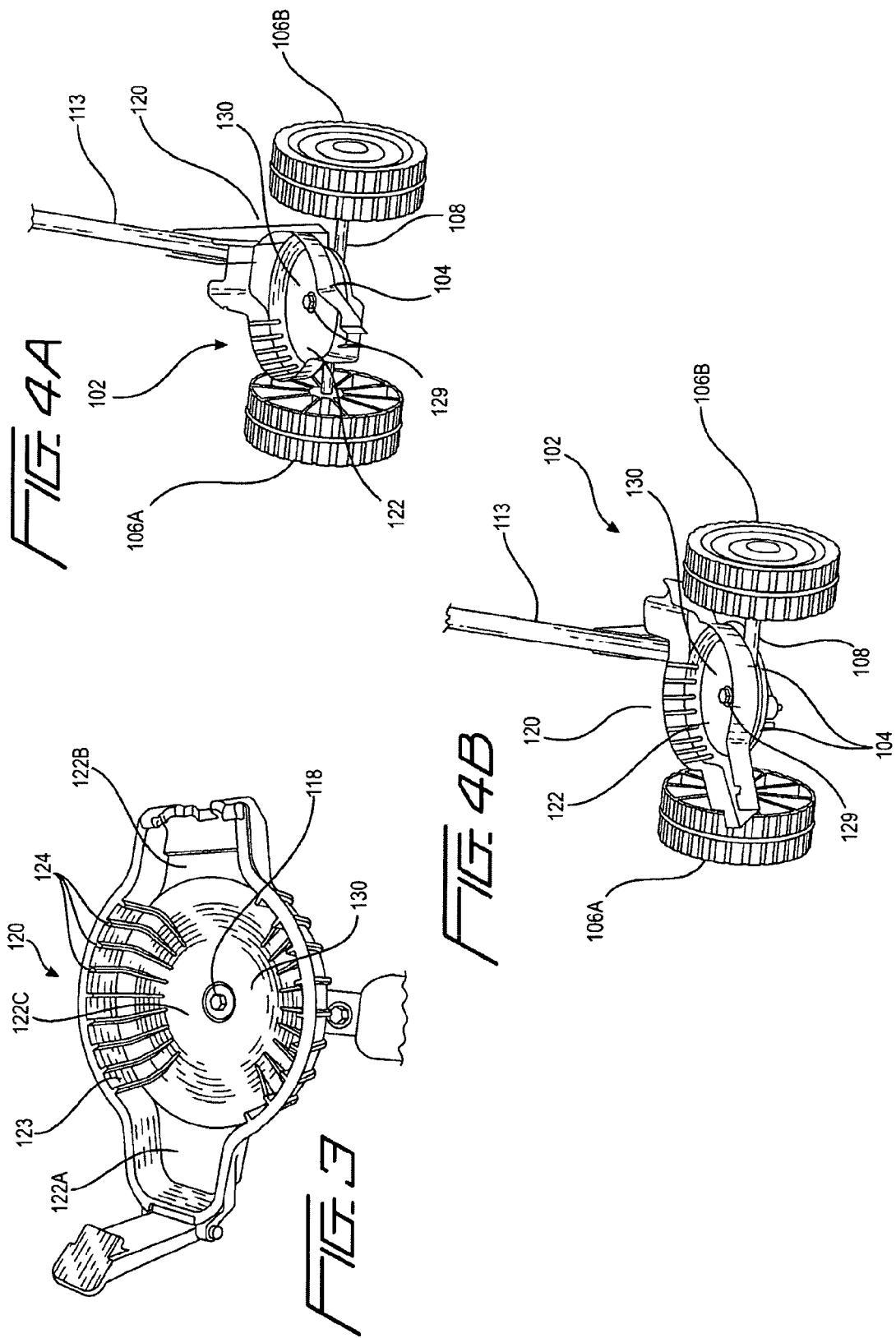

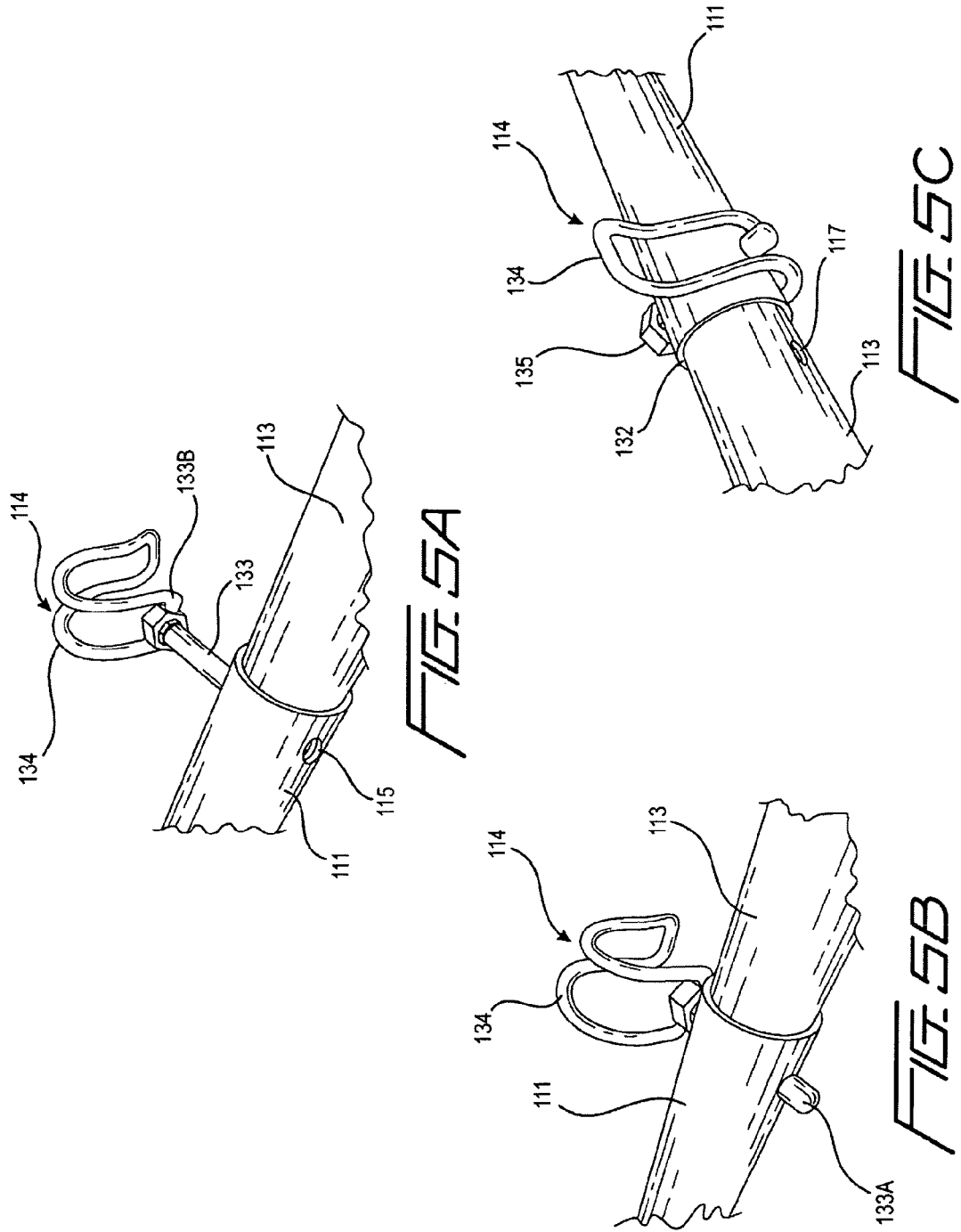

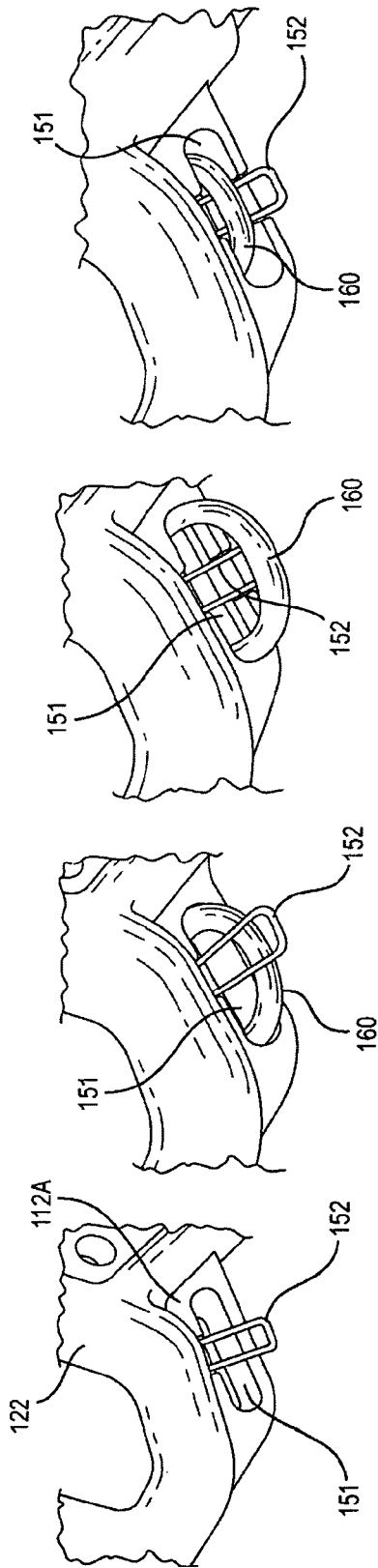
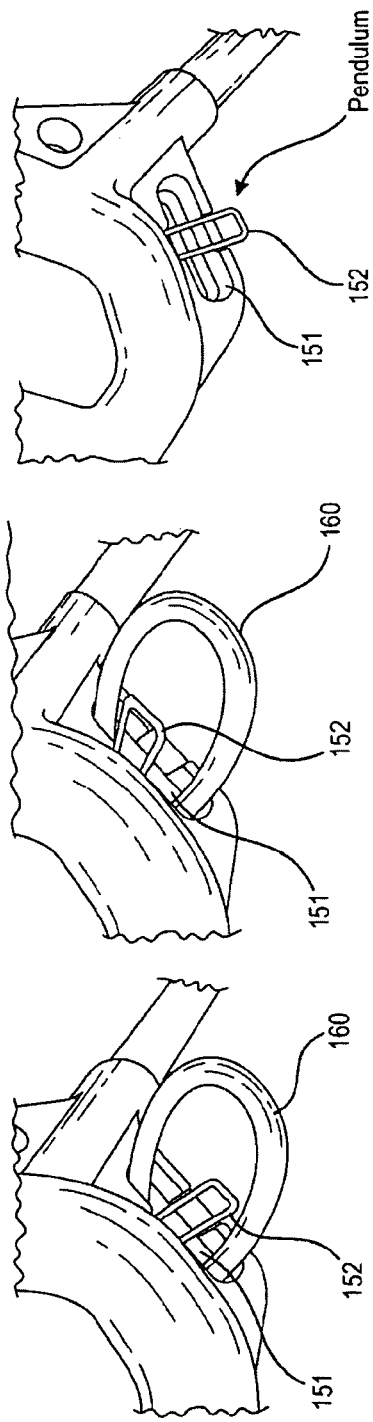
FIG. 6A  FIG. 6B  FIG. 6C  FIG. 6D
FIG. 6E  FIG. 6F  FIG. 6G

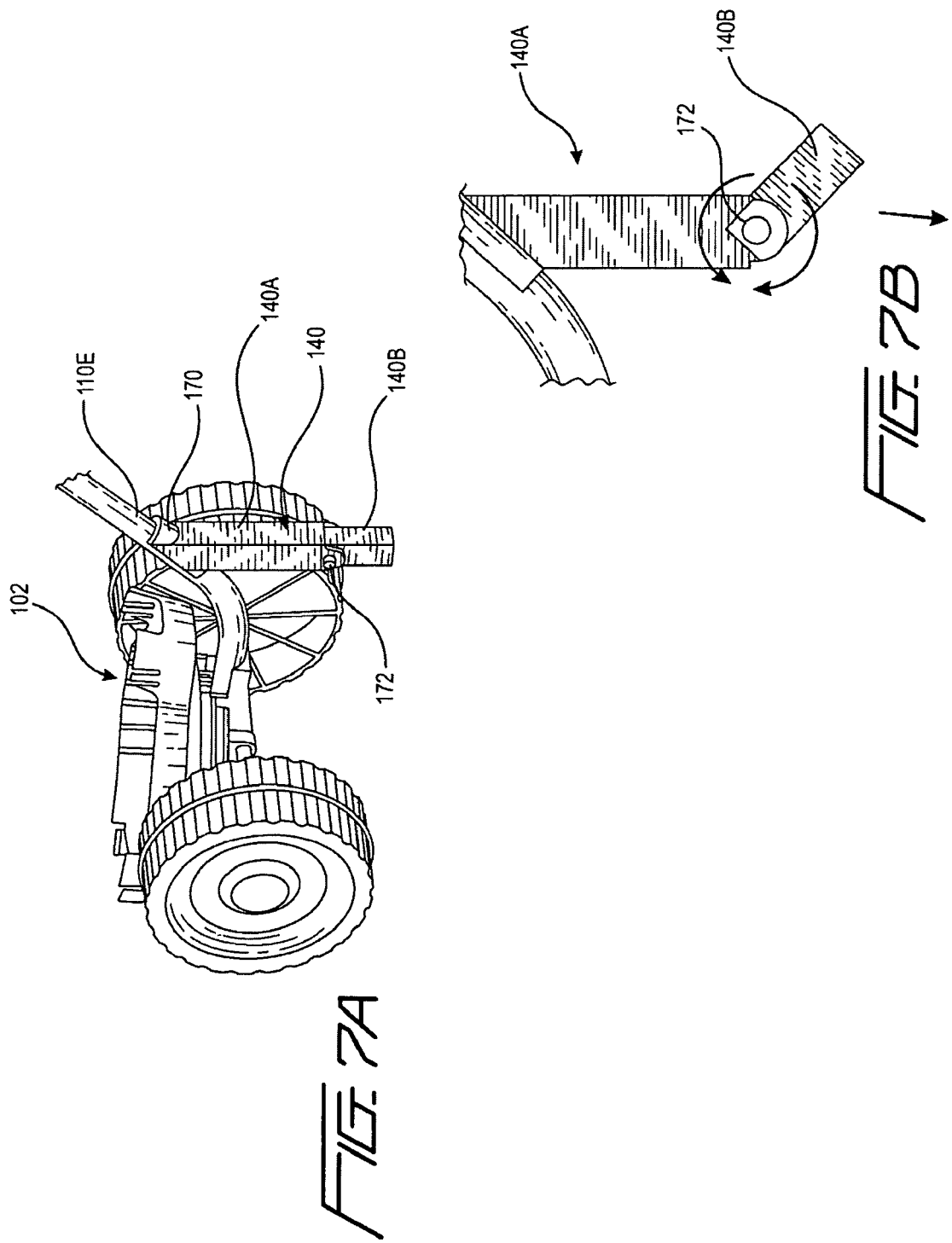

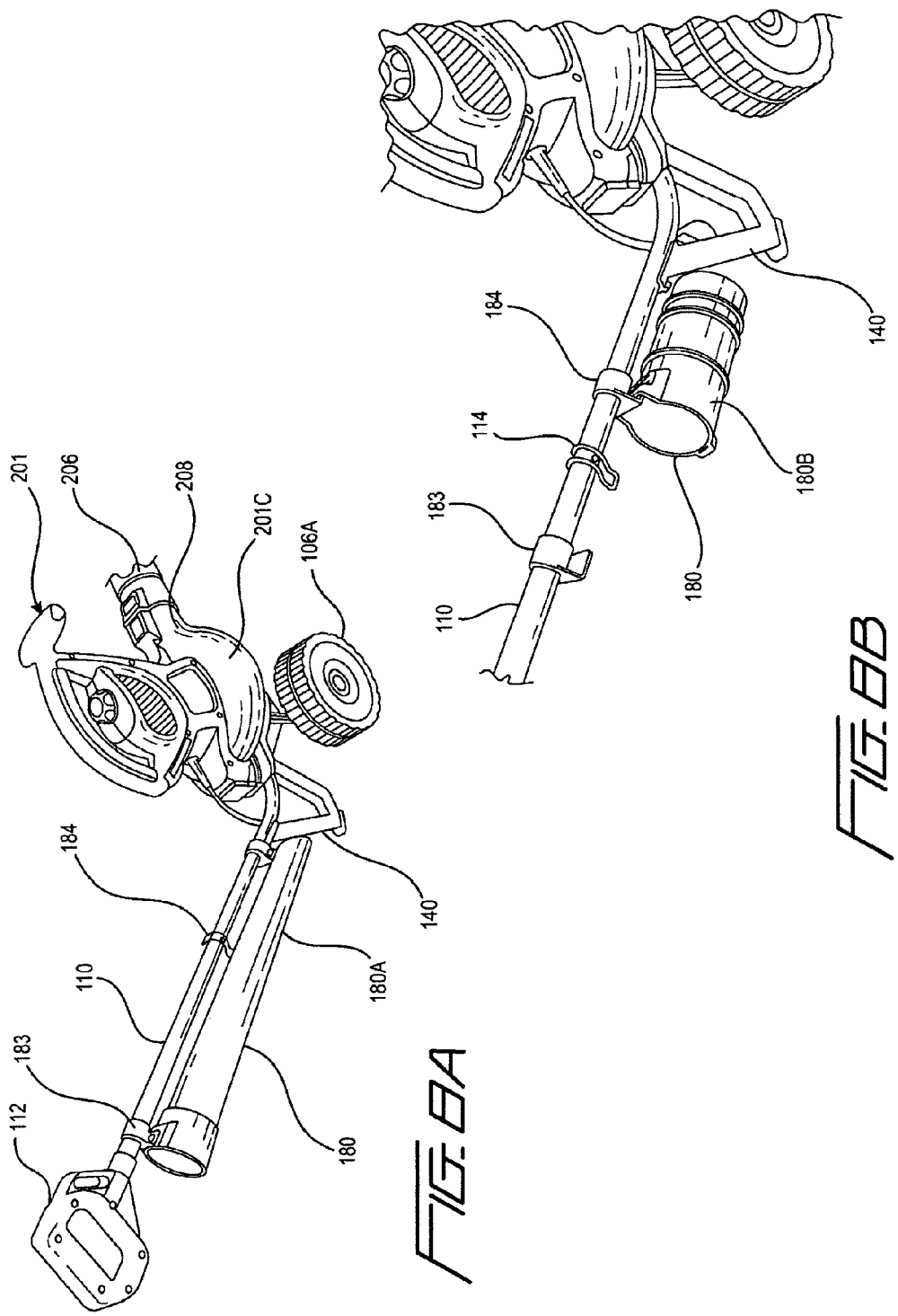

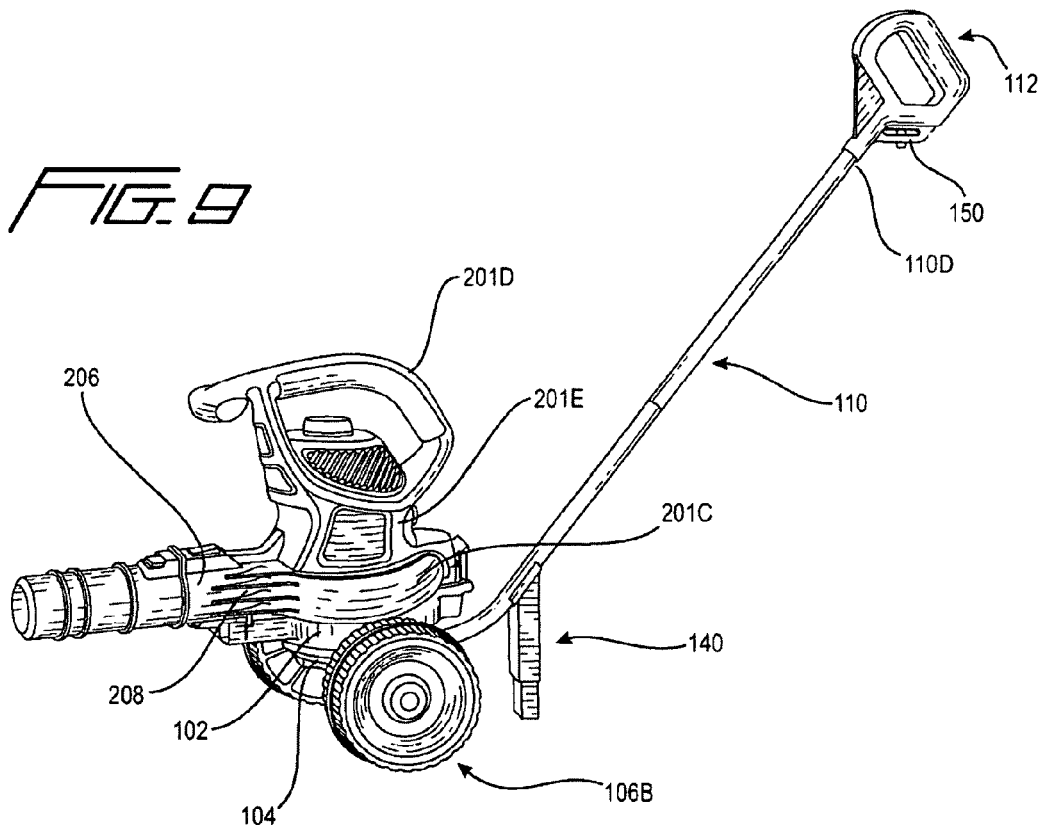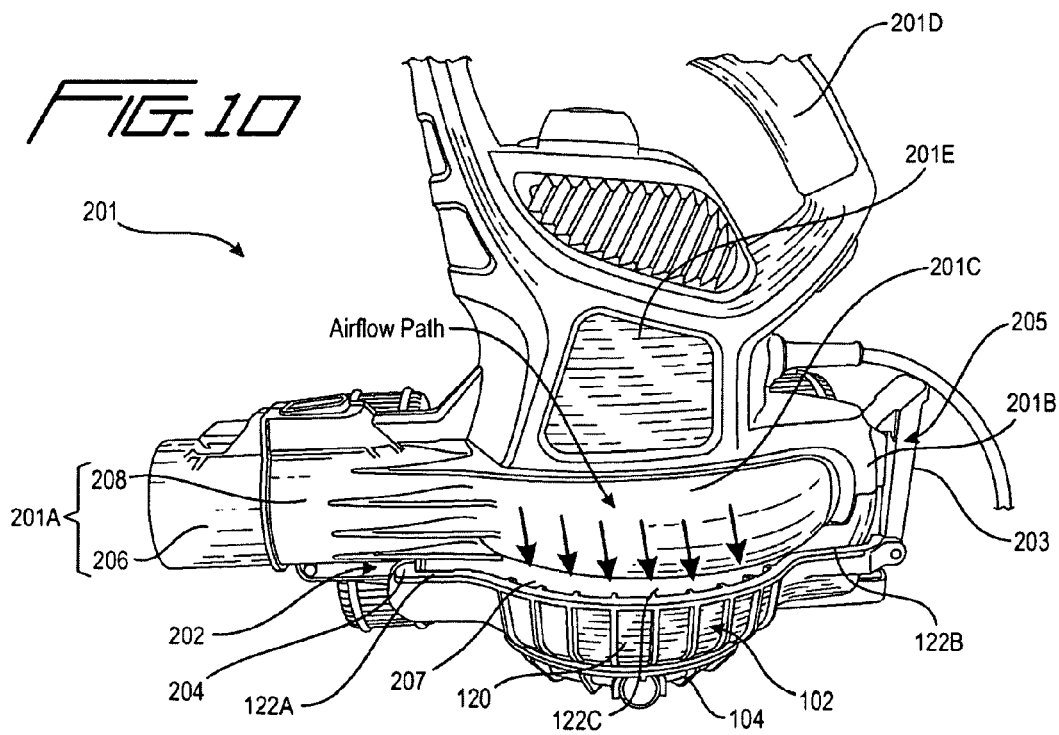

BLOWER CART

FIELD OF THE INVENTION

The present invention generally relates to a cart for holding and transporting portable blowers. More particularly, the present invention relates to a cart which is configured to make a portable blower attached thereto easier to maneuver and easier to use.

BACKGROUND OF THE INVENTION

Carts for supporting and transporting landscaping devices are known in the art. Reference is made, e.g., to U.S. Pat. Nos. 3,618,157; 4,118,826; 5,294,063; 5,722,110; 6,009,595; 6,185,917; and 6,226,833; U.S. Design Pat. No. 410,785; and U.S. Patent Application Publication No. 2005/0132531.

It is continually desirable to make portable blowers more user-friendly and maneuverable.

SUMMARY OF THE INVENTION

In various exemplary embodiments, the present invention provides a blower cart for holding and transporting a portable blower, wherein the blower cart includes one or more of the following:

a rotary member having an upper receptacle portion and a lower cylindrical stem portion, the upper receptacle portion having a cavity formed therein for receiving a housing of the portable blower, the cavity being defined by an inner side wall having formed thereon a plurality of laterally-spaced, longitudinally-extending ribs, the lower cylindrical stem portion being of a given outer diameter and having a plurality of laterally-spaced, longitudinally extending grooves formed in an outer side wall thereof;

a cylindrical base member having formed in a top surface thereof a cavity in which the lower cylindrical stem portion is seated, the cavity of the cylindrical base member being defined by an inner side wall having formed therein a plurality of laterally-spaced, longitudinally formed spring fingers, wherein the cavity of the cylindrical base member has an inner diameter that is larger than the outer diameter of the lower cylindrical stem portion such that the spring fingers are engaged with the grooves formed in the outer side wall of the lower cylindrical stem;

a tubular member attached at a first lower portion thereof to the rotary member, and fixedly attached at second and third lower portions thereof to the cylindrical base member;

a rotatable attachment member for rotatably attaching the rotary member to the first lower portion of the tubular member, the first and second lower portions of the tubular member being disposed within the cavity of the cylindrical base member, wherein the rotary member is rotatable while the lower cylindrical stem portion thereof is seated within the cavity of the cylindrical base member;

a handle attached to an upper end portion of the tubular member; and at least one wheel attached to the cart for guiding the cart over a surface.

In preferred embodiments of the cart of this invention, the rotatable attachment member is made up of a bolt rotatably secured through a first through-hole formed in a central floor part of the cavity formed in the upper receptacle portion of the rotary member and through a second through-hole aligned with the first through-hole and formed in the first lower portion of the tubular member. When the rotary member is rotated, spring fingers formed in the cylindrical base member will hold the rotary member at a desired angle, thus making it easier for the user to manipulate the blower during use thereof.

In a further preferred embodiment of the cart of this invention, the tubular member has an upper tube and a lower tube, wherein the upper tube has a hollow body with a diameter relative to the diameter of the lower tube such that at least a portion of the lower tube slidably fits within the upper tube. Also preferably, the upper tube has a single hole formed therein and the lower tube has a plurality of holes formed longitudinally thereon, wherein the single hole is aligned with one of the plurality of holes so as to provide the tubular member with a given height. When the tubular member is in the form of two tubes, a lock-and-height adjustment member, more preferably a spring lock, which engages the aligned holes, is preferably used to secure the upper and lower tubes together. This embodiment of the tubular member, along with the use of a spring lock, provides a user of the cart with a convenient way to adjust the height of the tubular member.

In another preferred embodiment thereof, the cart of this invention also includes a cord retention system for securing the blower's cord to the handle of the cart. The cord retention includes an elongated hole formed in a lower portion of the handle and a clip member pivotably attached to the handle at an area above the elongated hole. The elongated hole has a width and a length sufficient to receive a portion of a cord of the portable blower. The clip member is pivotably movable back and forth between an open position and a closed position relative to the elongated hole. When the clip member is in the open position, the cord is movable back and forth over and below the clip member. When the clip member is in the closed position, the cord is held in place between the clip member and the handle. The cord retention system disclosed herein provides for easy cord management during use of the cart.

In yet another preferred embodiment, the cart of this invention has a stand member for supporting the cart in an upright manner when the cart is at rest. The stand member is attached to a fourth lower portion of the tubular member, and has an upper stand part and a lower stand part. The upper stand part is hollow and has a diameter relative to the diameter of the lower stand part such that at least a portion of the lower stand part slidably fits within the upper stand part when the lower stand part is pushed up, e.g., by the force of the ground when the cart is placed at rest. In this position, the lower stand part cannot move and thereby provides stable support to the cart. The upper and lower stand parts are preferably connected to one another by means of a pivotable and longitudinally-movable axle inserted through a hole formed in the upper stand part and a groove formed in the lower stand part. When the cart is in use and the stand is lifted off the ground, the force of gravity pulls the lower stand part out of the upper stand part, and the lower stand part is able to freely pivot or swing about the axle. Because of its pivots or swings about, the lower stand part does not interfere with the cart's movement if the lower stand part encounters grass, the ground, or the like.

In another preferred embodiment, the cart of this invention further has a tool storage member composed of an elongated cone or cup attached to the tubular member. In this way, tools are conveniently stored in easy reach.

In a further preferred embodiment of the cart of this invention, the cart has a hook spring latch formed at a front part of the upper receptacle portion of the rotary member and a locking spring latch formed at a rear part of the upper receptacle portion of the rotary member. The hook spring latch and the locking spring latch are disposed to secure the portable blower housing to the rotary member of the cart. This arrangement facilitates placement of the housing onto the cart and its removal therefrom.

Preferably, the diameter of the cavity of the upper receptacle portion of the rotary member is sized such that a gap for an airflow path is created between the rotary member and the housing of the blower during use of the blower.

Further areas of applicability of the present invention will become apparent from the detailed description provided hereinafter. It should be understood that the detailed description and specific examples, while indicating the preferred embodiments and best mode of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 3 is a top view of the rotary member of the blower cart shown in FIG. 1;

FIG. 4A is a perspective view of the rotary member in an initial position;

FIG. 4B is a perspective view of the rotary member after it has been rotated to a second position;

FIG. 5A is a perspective view of a pin of a spring lock as it is being inserted through holes formed in upper and lower tubes of the blower cart;

FIG. 5B is a perspective view of a spring lock for securing the upper and lower tubes of the tubular member, wherein the spring lock has been inserted through holes formed in the upper and lower tubes of the blower cart;

FIG. 5C is a perspective view of the spring lock shown in FIG. 5B in its locked or closed position such that it secures together the upper and lower tubes of the blower cart;

FIG. 6A is a perspective view of a portion of the handle and cord retention system used in a preferred embodiment of the present invention, with a clip member in a lowered position;

FIG. 6B is a perspective view of the handle shown in FIG. 6A, wherein the clip member is in a raised position;

FIG. 6C is a perspective view of the handle shown in FIG. 6B, showing the cord portion being slipped over the clip member in its raised position;

FIG. 6D is a perspective view of the handle shown in FIG. 6C, wherein the cord portion is slipped over the clip member;

FIG. 6E is a perspective view of the handle shown in FIG. 6D, where the cord portion is moved outwardly away from the elongated hole;

FIG. 6F is a perspective view of the handle shown in FIG. 6E, where the clip member has been raised to its upper position;

FIG. 6G is a perspective view of the handle shown in FIG. 6F, wherein the cord portion has been removed from the handle through the elongated hole, and the clip member has been placed in its lower position;

FIG. 7A is a perspective view of a stand member used in a preferred embodiment of the invention;

FIG. 7B is a close-up view of the upper and lower stand parts of the stand shown in FIG. 7A;

FIG. 8A is a perspective view of a first embodiment of a tool storage member which can be used in the invention;

FIG. 8B is a perspective view of a second embodiment of a tool storage member which can be used in the invention;

FIG. 9 is a perspective view of a blower secured to the blower cart of the invention;

FIG. 10 is a close-up view of a blower secured to the blower cart of FIG. 9;

DETAILED DESCRIPTION OF THE PREFERRED EMBODIMENTS

Exemplary preferred embodiments of the present invention will now be described with reference to the figures.

Figure 1:
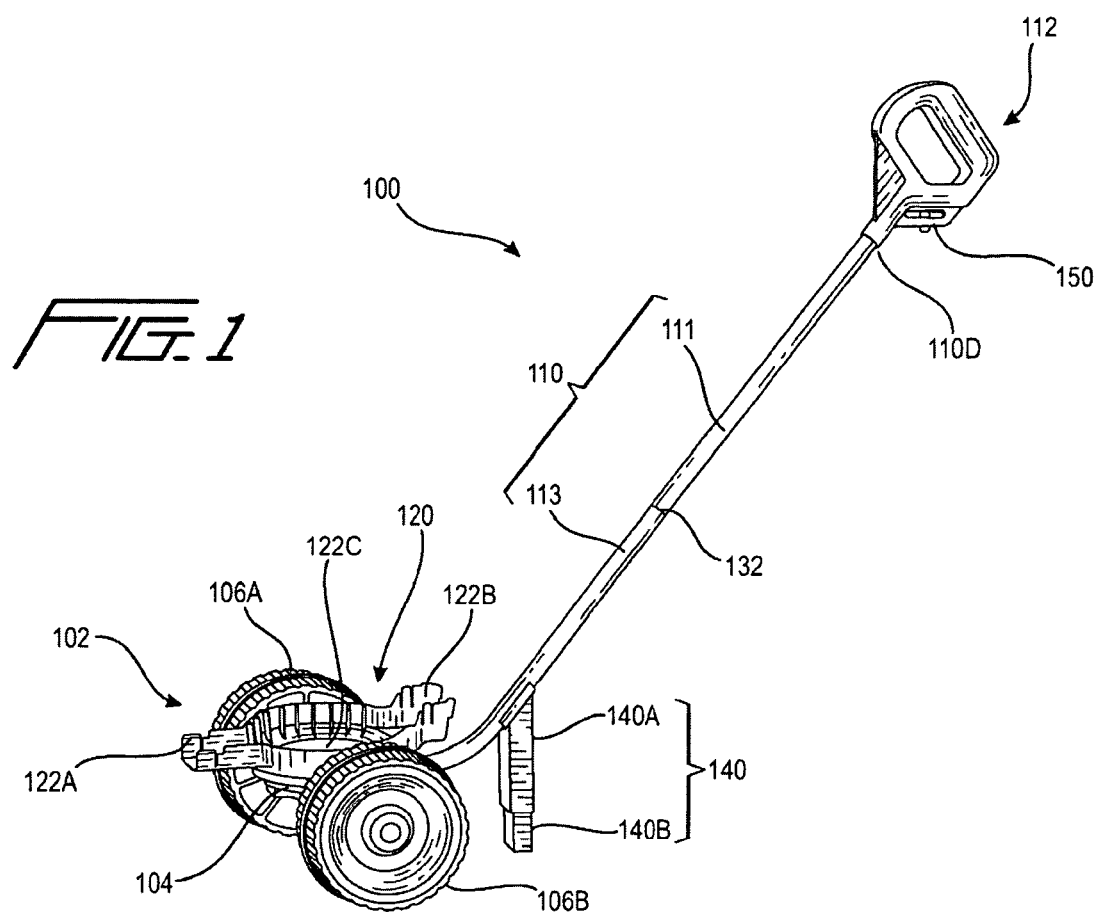
FIG. 1 is a perspective view of a blower cart according to an embodiment of the present invention.

FIG. 1 shows a preferred embodiment of a blower cart 100 within the scope of the invention. Blower cart 100 includes a rotary member 102 for holding a portable blower (shown in FIG. 9), a cylindrical base member 104 for supporting the rotary member 102, two wheels 106A, 106B, mounted on opposite ends 108A, 108B of an axle 108 (see FIG. 2) disposed at the cylindrical base member 104, a tubular member 110 attached to the rotary member 102 and the cylindrical base member 104, and a handle 112 attached to the tubular member 110. As shown in FIGS. 5A-5C and discussed in more detail below, the blower cart 100 preferably includes a locking piece 114 which functions as a lock-and-height adjustment member for adjusting the height of the tubular member 110, a stand member 140 (see, e.g., FIGS. 1, 7A and 7B) for supporting the cart in an upright manner when the cart is at rest, and a cord retention system 150 (see, e.g., FIGS. 1 and 6A-6G).

Figure 2:
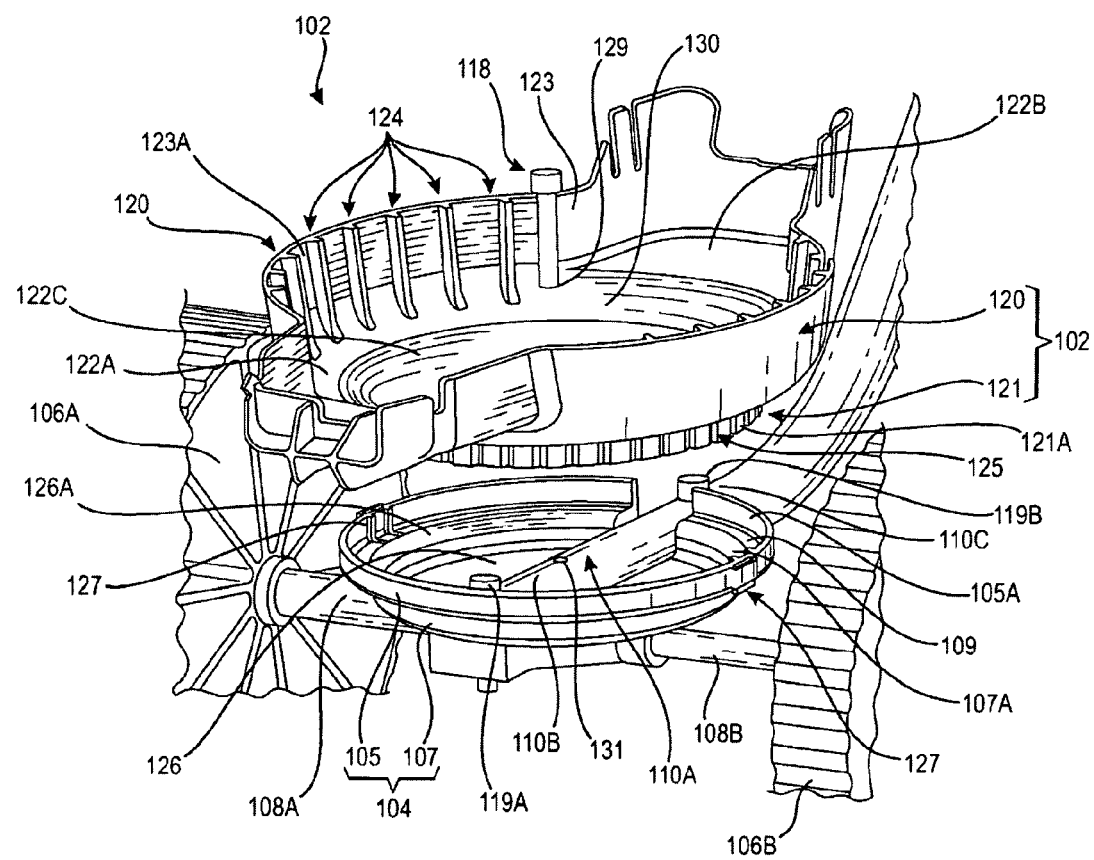
FIG. 2 is an exploded perspective view of the rotary member and the cylindrical base member of the blower cart shown in FIG. 1.

FIGS. 2 and 3 show close-up views of the rotary member 102.

Rotary member 102 includes an upper receptacle portion 120 and a lower cylindrical stem portion 121.

Receptacle portion 120 has a cavity 122 formed therein for receiving a housing of a portable blower therein. Cavity 122 preferably includes a front sub-cavity 122A for holding a front part of a portable blower housing therein, a rear sub-cavity 122B for holding a rear part of a portable blower housing, and a center sub-cavity 122C disposed between the front and rear sub-cavities for holding an intermediate part of a housing of a portable blower. The cylindrical stem portion 121 of rotary member 102 is typically disposed directly underneath the center sub-cavity 122C.

Cavity 122 is defined by an inner side wall 123 having formed thereon a plurality of laterally-spaced, longitudinally-extending ribs 124. Preferably, ribs 124 are formed on an inner side wall 123A of center sub-cavity 122C. Ribs 124 are intended to engage with corresponding grooves (not shown) formed on an outer side wall of the intermediate part of a blower housing disposed within cavity 122.

The lower cylindrical stem portion 121 of rotary member 102 has a plurality of laterally-spaced, longitudinally extending grooves 125 formed in an outer side wall 121A thereof.

The cylindrical base member 104, which can best be seen in FIG. 2, has formed in a top surface thereof a cavity 126 in which the lower cylindrical stem portion 121 of rotary member 102 is seated. The cavity 126 of the cylindrical base member is defined by an inner side wall 126A in which a plurality of laterally-spaced, longitudinally formed receiving fingers 127 are formed. Cavity 126 has an inner diameter that is larger than the outer diameter of the lower cylindrical stem portion 121 such that the receiving fingers 127 are engaged with the grooves 125 formed in the outer side wall 121A of the lower cylindrical stem.

In a particularly preferred embodiment thereof, base member 104 preferably has an upper annular part 105 and a lower annular part 107 which are integrally formed and concentric relative to one another. Preferably, cavity 126 extends completely through upper annular part 105 and partially through lower annular part 107. Inner side wall 126A of base member 104 is preferably composed of inner side walls 105A and 107A of the upper and lower annular parts 105, 107, respectively. Receiving fingers 127 preferably extend along the inner side walls 105A and 107A. Upper annular part 105 generally has a larger diameter than does lower annular part 107 as to form a ledge 109 therebetween. The lower cylindrical stem portion 121 of rotary member 102 sits upon ledge 109, and the grooves 125 formed on the outer side wall 121A of lower cylindrical stem portion 121 are engaged with the receiving fingers 127.

Referring again to FIG. 1, tubular member 110 preferably comprises an upper tube 111 and a lower tube 113. The upper tube 111 has a hollow body with a diameter relative to the diameter of the lower tube 113 such that at least a portion of the lower tube 113 slidably fits within the hollow body of the upper tube 111 (see, e.g., FIGS. 5A-5C). Preferably, upper tube 111 has a single hole 115 formed therein and the lower tube 113 has a plurality of holes 117 formed longitudinally thereon. The single hole 115 is aligned with one of the plurality of holes 117 so as to provide the tubular member with a given height. Preferably, a lock-and-height adjustment member, more preferably locking piece 114, described in greater detail below, is used to engage the aligned holes and secure the upper and lower tubes together.

As can be seen in FIGS. 5A-5C, locking piece 114 is composed of a pin 133 with a free end 133A, a pivotable lever 134 having a cross-section such that the lever can cup a junction 132 where the upper and lower tubes are aligned via holes 115 and 117, and a cap 135 disposed on a second end 133B of the pin 133, the cap 135 being configured to pivotably secure lever 134 to the pin 133. To use locking piece 114 to secure tubes 111 and 113, the pin 133, via free end 133A, is inserted through the aligned holes 115 and 117 as shown in FIGS. 5A and 5B, and the lever 134 is pivoted so as to cup junction 132, thereby locking the upper and lower tubes together (see FIG. 5C).

To change the height of the tubular member, lever 134 is pivoted back so as to un-cup the junction 132, pin 133 is removed from the through-holes, and the tubes 111 and 113 are slidably moved relative to one another so that a different one of the multiple through-holes 117 is aligned with the single hole 115, the pin 133 is reinserted through the aligned through-holes, and the lever 134 is pivoted to cup the junction 132 and secure the tubes together. Accordingly, locking piece 114 provides a convenient way to adjust the height of the tubular member.

Referring again to FIG. 2, a first attachment member 118 attaches the rotary member 102 to a first lower portion 110A of the tubular member 110, and second and third attachment members 119A and 119B, respectively, secure the cylindrical base member 104 to a second and third lower portions 110B and 110C, respectively, of the tubular member. Such attachments can be achieved by any suitable means. Most preferably, as shown in the figures, the attachment member 118 attaches the rotary member 102 to the first lower portion of the tubular member 110 via a bolt rotatably secured in a first through-hole 129 formed in a central portion of floor 130 in center sub-cavity 122C of the rotary member 102, and in a corresponding second through-hole 131 formed in the first lower portion 110A of tubular member 110. Second and third attachment members 119A and 119B are also preferably bolts.

First attachment member 118 is secured in a manner that attaches rotary member 102 within the cavity 126 of the base member 104, while still allowing rotation of rotary member 102 from an initial position (shown in FIG. 4A) to a second position (shown in FIG. 4b). Thus, the rotary member 102 may be rotated around an axis corresponding to the longitudinal axis of the first attachment member 118.

The first and second lower portions 110A and 110B of the tubular member are disposed within the cavity 126 of the cylindrical base member (see, e.g., FIG. 2).

As can be seen in FIG. 2, when the rotary member 102 is rotated, receiving fingers 127 formed in the cylindrical base member 104 engage with grooves 125 formed in the lower cylindrical stem portion 121 of rotary member 102 and hold the rotary member 102 at a desired angle.

Cylindrical base member 104 is attached directly or indirectly to axle 108, which is used to mount at least one wheel 106A or 106B to the cart. Preferably, cart 100 has a pair of wheels 106A, 106B mounted on opposite ends 108A, 108B of axle 108. Also preferably, second through-hole 131 receives a bolt or other attachment piece to secure base member 104 to axle 108.

Referring back to FIG. 1, the blower cart of this invention further includes a handle 112. Handle 112 is attached to an upper end 110D of tubular member 110 or upper tube 111.

In a preferred embodiment of the blower cart of this invention, the handle member 112 is configured to include a cord retention system 150, as shown in, e.g., FIGS. 6A-6G. The cord management system is comprised of an elongated hole 151 formed in the handle 112 and a clip member 152, which is preferably U-shaped, pivotably attached to a section 112A of the handle above the elongated hole 151. Clip member 152 is located so that in its lowered position, as shown in FIGS. 6A, 6E and 6G, it partially blocks the elongated hole. In its raised position, as shown in FIGS. 6B-6D and 6F, the clip member does not block the elongated hole. Preferably, the plane of the clip member 152 in its raised position is perpendicular to the plane of the elongated hole 151. The plane of the clip member in its lowered position is preferably disposed at less than a 90° angle relative to the plane of the elongated hole.

As noted above, FIG. 6A shows clip member 152 in its lowered position, the clip member partially blocking or covering elongated hole 151. To use the cord management system of this invention, the clip member is raised as shown in FIG. 6B so that the plane of the clip member is at a substantially right angle relative to the plane of the elongated hole 151 and the clip member does not block or cover the elongated hole. A portion of a cord 160 of a portable blower is inserted through elongated hole 151 between the hole and the raised clip member 152 (i.e., the cord portion is under the raised clip member). The cord portion 160 is then moved to a position above the raised clip member (FIG. 6C) and pulled back so that the cord portion rests against handle section 112A, where the clip member is attached to handle member 112 (FIG. 6D). The clip member 152 is then placed in its lower position. FIG. 6D illustrates the cord retention system of this invention securing the cord portion 160 in place.

To remove the cord portion from the cord retention system, the clip member 152 is placed in its lowered position, and cord portion 160 is pushed outwardly away from clip member 152, as shown in FIG. 6E. The clip member is then placed back in its raised position, and the cord portion 160 is passed underneath the clip member and back through the elongated hole 151 away from handle 112 (see FIG. 6F). The clip member may then be placed back in its lowered position as shown in FIG. 6G. It should be apparent, therefore, that the cord retention system 150 of this invention provides easy cord management for a user of the cart.

Referring again to FIG. 1, the cart of this invention also preferably includes a stand member 140, which supports cart 100 in an upright position when the cart is at rest. As can be further seen in FIGS. 7A and 9, stand member 140 is attached to a fourth lower portion 110E of tubular member 110, preferably by means of a bolt 170 (see, e.g., FIG. 7A). Stand 140 is preferably composed of an upper stand part 140A and a lower stand part 140B. Upper stand part 140A is attached to tubular member 110 (see, e.g., FIG. 7A). Upper stand part 140A has a hollow body and a diameter relative to the diameter of the lower stand part 140B such that at least a portion of the lower stand part 140B fits inside upper stand part 140A when the lower stand part is pushed up, e.g., by the force of the ground when the cart is at rest.

As further illustrated in FIG. 7B, the upper and lower stand parts are preferably connected to one another by means of a pivotable axle 172 inserted through a hole (not shown) formed in the upper stand part and a groove (not shown) formed in the lower stand part.

When cart 100 is placed at rest, the tubular member 110 is moved so as to lower the stand member 140 to the ground. The lower stand part 140B is forced by the ground to slide upwardly into the hollow body of upper stand part 140A. Once the lower stand part 140B is in place within the upper stand part 140A, the lower stand part cannot move and provides stable support for the cart. When the cart is used, the cart is lifted up by means of handle 112 so as to create a gap between the stand member 140 and the ground. Under the force of gravity, the lower stand part 140B slides downwardly out of the hollow body of the upper stand part 140A and pivots or swings freely about the axle 172. Because it can swing freely about, the lower stand part 140B does not create an obstacle to the cart's movement if the lower stand part comes into contact with the ground, grass, or other surface.

In another preferred embodiment of the invention, cart 100 includes a tool storage member 180 attached to the tubular member 110 (see FIGS. 8A and 8B). The tool storage member 180 is preferably in the form of an elongated cone 180A (FIG. 8A) or an elongated cup 180B (FIG. 8B), each with an open top. The tool storage member 180 is preferably attached to tubular member 110 via upper and lower attachment elements 183 and 184, respectively. The attachment elements 183 and 184 can be any conventional attachment structures used to secure two elongated, cylindrically-shaped articles that are longitudinally aligned with each other. Having a tool storage member conveniently located on the tubular member makes it easy to retrieve tools as they are needed and helps the user of the cart stay organized.

FIG. 9 illustrates a blower secured to the cart assembly 200 within the scope of the present invention. The portable blower housing 201 can be any conventional portable blower housing. As shown in FIGS. 9 and 10, blower housing 201 has a cylindrically-shaped front part 201A, a rear part 201B, and an intermediate part 201C disposed between the front and rear parts. Parts 201A, 201B and 201C are substantially coplanar. Blower housing 201 also has a handle 201D which can be used to lift the housing from cart 100. Handle 201D is formed within an upper part 201E of the housing, wherein upper part 201E is disposed in a plane which is substantially perpendicular to the plane of the front, rear, and intermediate parts of the housing.

Blower housing 201 is supported by the rotary member 102 of cart 100. Specifically, the portable blower housing sits within cavity 122 of the upper receptacle portion 120 of the rotary member. The front part 201A of the blower housing is composed of two parts, specifically an outer part 206 and an inner part 208 (see, e.g., FIG. 10). The outer part 206 is used to attach the blower housing to a blower tube (not shown). The inner part 208 is received within the cavity 122 of the rotary member (specifically front sub-cavity 122A). Outer part 206 extends outwardly away from rotary member 102. The rear part 201B of the blower housing sits within the rear sub-cavity 122B, and the intermediate part of the housing 201C of the blower sits within the center sub-cavity 122C.

As mentioned previously, the rotary member 102 is rotated around an axis corresponding to the longitudinal axis of the bolt 118. Thus, with respect to the blower housing, the rotary member is rotated in a plane which is horizontal to the plane of the front, rear and intermediate parts of the housing.

As can be seen in FIG. 10, the diameter of the cavity 122 of the upper receptacle portion 120 of rotary member 102 is preferably sized so that ribs 124 engage the blower housing and create gaps 207 between the rotary member and the blower housing 201C, as indicated by the arrows.

Figure 11:
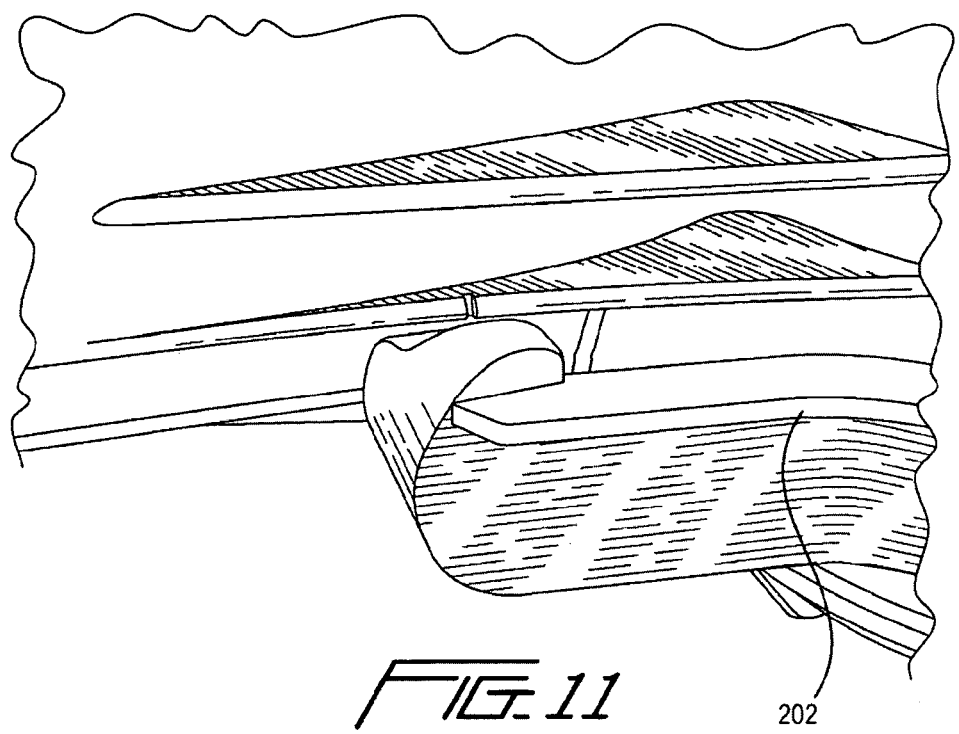
FIG. 11 is a close-up view of a hook latch which secures a front section of the cart to a corresponding front section of a blower.
Figure 12:
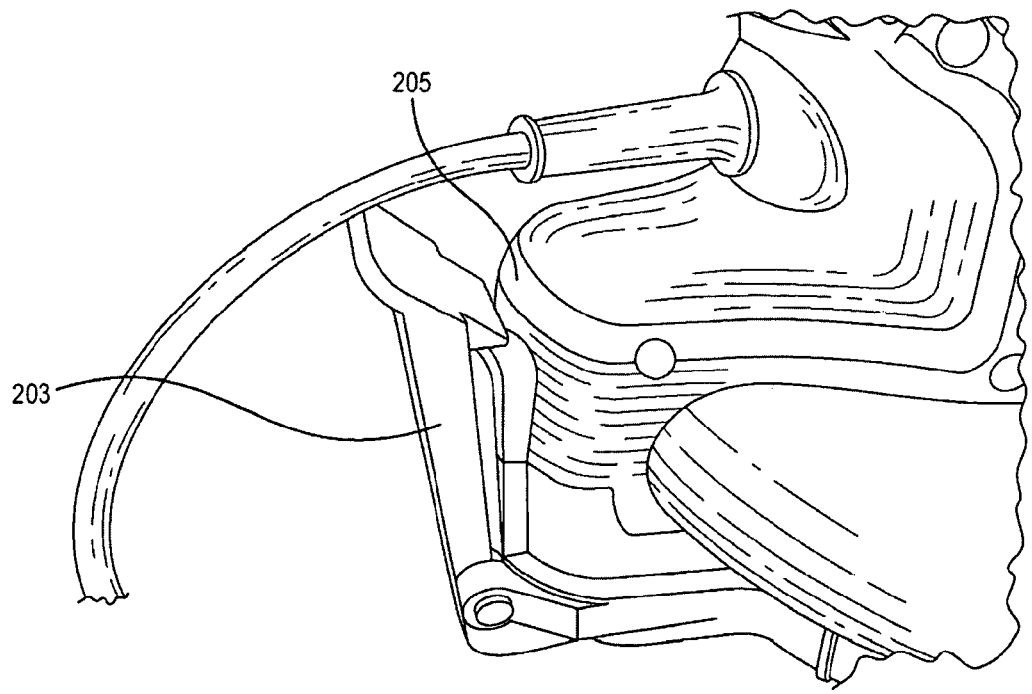
FIG. 12 is a close-up view of a locking spring latch which can be used to secure a rear section of the cart to a corresponding rear section of a blower.

In one embodiment of the present invention, blower housing 201 is held to the rotary member 102 of cart 100 by means of gravity. In a preferred embodiment, blower housing 201 is secured to rotary member 102 by means of a hook latch 202 attached to a front wall 204 of rotary member 102, and a spring-loaded locking latch 203 attached to a rear wall 205 of rotary member 102 (see FIGS. 10-12). Hook latch 202 extends upward from the front wall 204 to engage a front portion of the blower housing. The locking latch 203 pivotally extends upward from rear wall 205 to engage a rear portion of the blower housing.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

We claim:

1. A cart for holding and transporting a portable blower, comprising:
   a rotary member having an upper receptacle portion and a lower cylindrical stem portion, the upper receptacle portion having a cavity formed therein for receiving a housing of the portable blower, the cavity being defined by an inner side wall;
   a cylindrical base member having formed in a top surface thereof a cavity in which the lower cylindrical stem portion is seated, wherein the cavity of the cylindrical base member has an inner diameter that is larger than an outer diameter of the lower cylindrical stem portion;
   an attachment member for attaching the rotary member to the cylindrical base member, wherein the rotary member is rotatable while the lower cylindrical stem portion thereof is seated within the cavity of the cylindrical base member;
   a tubular member attached to the cart and having a handle attached to an upper end thereof;
   at least one wheel attached to the cart for guiding the cart over a surface; and
   a locking spring latch formed on the upper receptacle portion of the rotary member for securing the portable blower to the rotary member of the cart,
   wherein the rotary member is mounted to the cylindrical base member by the attachment member to permit the rotary member to be moved between a lowered position in which the rotary member is rotatably fixed relative to the base member, and a raised position in which the rotary member is rotatable relative to the base member by being lifted from the base member and rotated to a desired position while the rotary member is still attached to the base member by the attachment member.

2. The cart according to claim 1, wherein the inner side wall of the upper receptacle portion has a plurality of laterally-spaced, longitudinally-extending ribs.

3. The cart according to claim 1, wherein the lower cylindrical stem portion of the rotary member has a plurality of laterally-spaced, longitudinally extending grooves formed in an outer side wall thereof.

4. The cart according to claim 1, further comprising a cord retention system comprising:
  an elongated hole formed in a portion of the handle; and
  a clip member pivotably attached to the handle adjacent the elongated hole, the elongated hole having a width and a length sufficient to receive a portion of a cord of the portable blower, and the clip member being pivotably movable back and forth between an first position and a second position relative to the elongated hole.

5. The cart according to claim 1, further comprising a stand member for supporting the cart in an upright manner, the stand member being attached to a lower portion of the tubular member, wherein a portion of the stand is pivotable.

6. The cart according to claim 1, further comprising a tool storage member attached to the tubular member, the tool storage member selected from the group consisting of an elongated tube and an elongated cup.

7. The cart according to claim 1, further comprising a hook latch comprising a rigid hook fixed relative to the tubular member and adapted to engage the portable blower, and wherein the spring latch comprises a spring biased hook that pivots relative to the tubular member and is adapted to engage the portable blower.

8. The cart according to claim 3, wherein the cavity formed in the top surface of the cylindrical base member is defined by an inner side wall having a plurality of laterally-spaced, longitudinally-extending ribs that engage the grooves formed in the outer side wall of the lower cylindrical stem.

9. The cart according to claim 4, wherein the tubular member comprises an upper tube and a lower tube, wherein:
  a portion of the lower tube slidably fits within the upper tube,
  one of the tubes has a single hole formed thereon and the other tube has a plurality of holes formed thereon,
  the holes on the tubes are aligned to adjust the height of the tubular member using a lock that engages the aligned holes and secures the upper and lower tubes together.

10. A cart for a powered outdoor device, comprising:
  a rotary member having an upper receptacle portion comprising a cavity formed therein for receiving an outdoor device, the rotary member being rotatably mounted relatively to an axle having wheels thereon; and
  a cylindrical base member;
  a tubular member having a handle extending upward from the rotary member for a user to grasp;
  an attachment member;
  the inside of the cavity comprising a plurality of ribs for abutting the outdoor device and creating a gap between a housing of the outdoor device and the rotary member, thereby allowing air to pass into the cavity; and
  wherein the rotary member is mounted to the cylindrical base member by the attachment member to permit the rotary member to be moved between a lowered position in which the rotary member is rotatably fixed relative to the base member, and a raised position in which the rotary member is rotatable relative to the base member by being lifted from the base member and rotated to a desired position while the rotary member is still attached to the base member by the attachment member.

11. The cart of claim 10, further comprising a stand member attached to the tubular member, the stand member being pivotable relative to the tubular member.

12. The cart according to claim 10, further comprising a cord retention system comprising:
  an elongated hole formed in a portion of the handle; and
  a clip member pivotably attached to the handle adjacent the elongated hole, the elongated hole having a width and a length sufficient to receive a portion of a cord of the powered outdoor device, and the clip member being pivotably movable back and forth between an open position and a closed position relative to the elongated hole.

13. The cart according to claim 10, further comprising a tool storage member attached to the tubular member, the tool storage member selected from the group consisting of an elongated tube and an elongated cup.

14. A cart for holding and transporting a portable blower, comprising:
  a set of wheels for guiding the cart over a surface;
  an axle coupled to the set of wheels;
  a handle extending upward from the axle;
  a rotary member having an upper receptacle portion, the rotary member being coupled to the axle and sized to receive the portable blower; and
  a cylindrical base member; and
  an attachment member,
  a locking spring latch formed on the upper receptacle portion of the rotary member for securing the portable blower to the rotary member of the cart,
  wherein the rotary member is rotatable about a substantially vertical axis to affect orientation of the portable blower,
  wherein the rotary member is mounted to the cylindrical base member by the attachment member to permit the rotary member to be moved between a lowered position in which the rotary member is rotatably fixed relative to the base member, and a raised position in which the rotary member is rotatable relative to the base member by being lifted from the base member and rotated to a desired position while the rotary member is still attached to the base member by the attachment member.

15. The cart according to claim 14, wherein the rotary member allows a user to removably couple the portable blower device to the cart.

16. The cart according to claim 14, wherein the rotary member comprises a cavity with a plurality of ribs thereon, such that the ribs contact the portable blower.

17. The cart according to claim 16, wherein the plurality of ribs create a gap between a housing of the powered outdoor device and the rotary member, thereby allowing air to pass into the cavity.

* * * * *